(No Model.) 5 Sheets—Sheet 1.

E. OEHRLE.
MACHINE FOR MAKING CEMENT PIPES.

No. 479,451. Patented July 26, 1892.

FIG. I.

WITNESSES:
A. C. Loomis
Henry M. Morrow

INVENTOR
Emanuel Oehrle (No Model.) 5 Sheets—Sheet 2.

E. OEHRLE.
MACHINE FOR MAKING CEMENT PIPES.

No. 479,451. Patented July 26, 1892.

WITNESSES:

Emanuel Oehrle INVENTOR (No Model.) 5 Sheets—Sheet 3.

E. OEHRLE.
MACHINE FOR MAKING CEMENT PIPES.

No. 479,451. Patented July 26, 1892.

WITNESSES: Emanuel Oehrle INVENTOR (No Model.) 5 Sheets—Sheet 4.
E. OEHRLE.
MACHINE FOR MAKING CEMENT PIPES.
No. 479,451. Patented July 26, 1892.
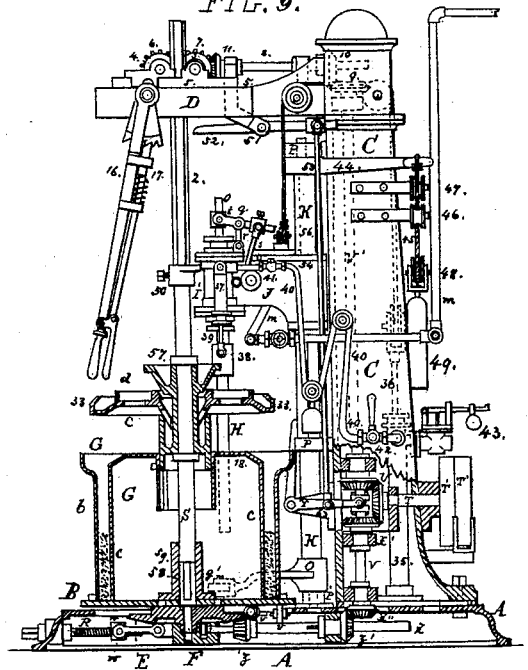
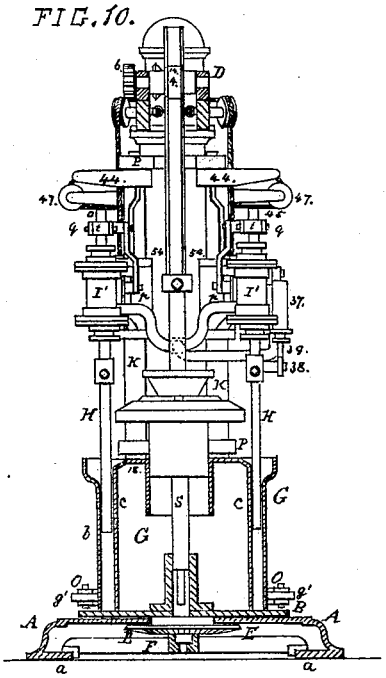
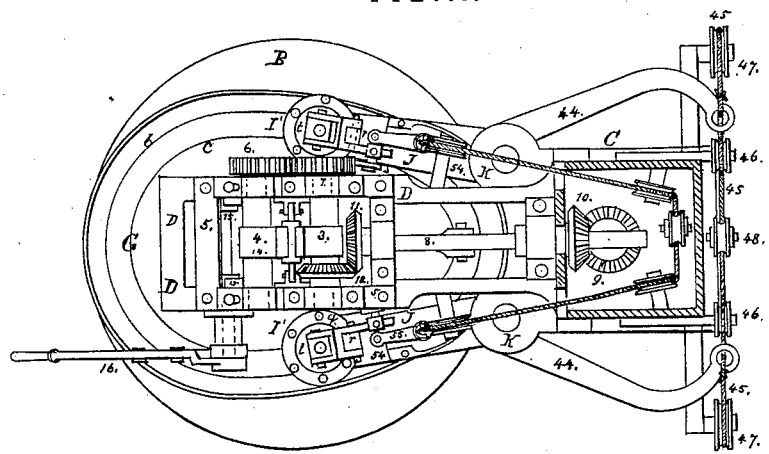
WITNESSES: Emanuel Oehrle  INVENTOR

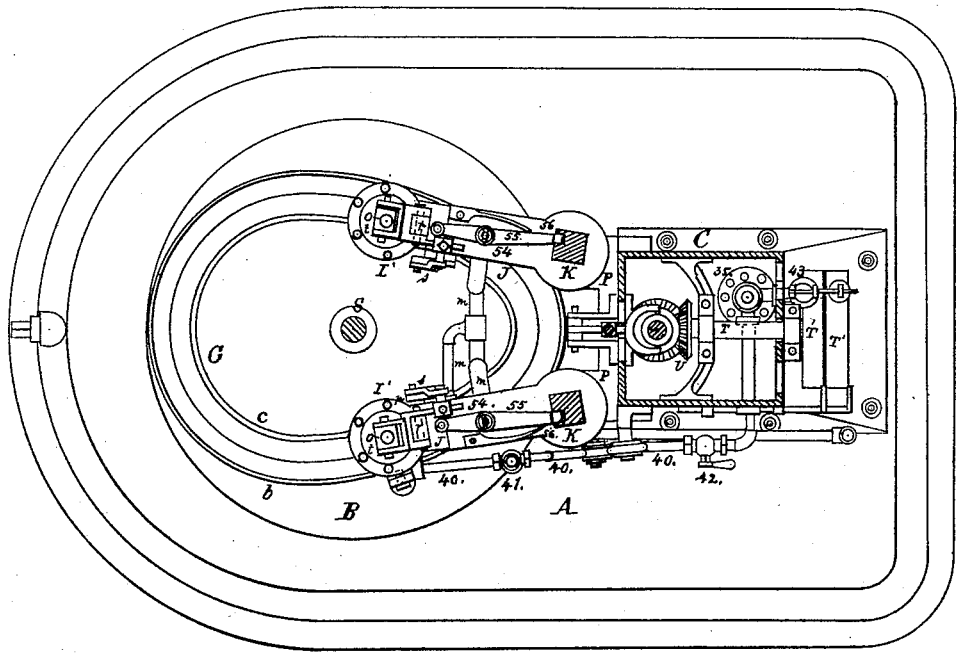

UNITED STATES PATENT OFFICE.

EMANUEL OEHRLE, OF OMAHA, NEBRASKA, ASSIGNOR TO JEFF W. BEDFORD, OF SAME PLACE.

MACHINE FOR MAKING CEMENT PIPES.

SPECIFICATION forming part of Letters Patent No. 479,451, dated July 26, 1892.

Application filed March 30, 1891. Serial No. 387,019. (No model.)

*To all whom it may concern:*

Be it known that I, EMANUEL OEHRLE, a citizen of the United States, residing at the city of Omaha, in the county of Douglas and State of Nebraska, have invented a new and useful Machine for Making Cement Sewer-Pipe, of which the following is a specification.

My invention relates to improvements in machines for molding cement sewer-pipe. In it vertical reciprocating steam-rammers operate in conjunction with a rotating sewer-pipe mold, and in it, after molding, the core part of the mold is rapidly raised by friction raising mechanism, and in it the counterbalancing of the rammers is done by air-pressure.

The objects of my improvement are, first, a more rapid and superior production of the sewer-pipe; secondly, a simpler, more durable, less expensive to operate, and cheaper machine than those now in use. I attain these objects by the machine illustrated in the accompanying drawings, in which—

Figure 1:
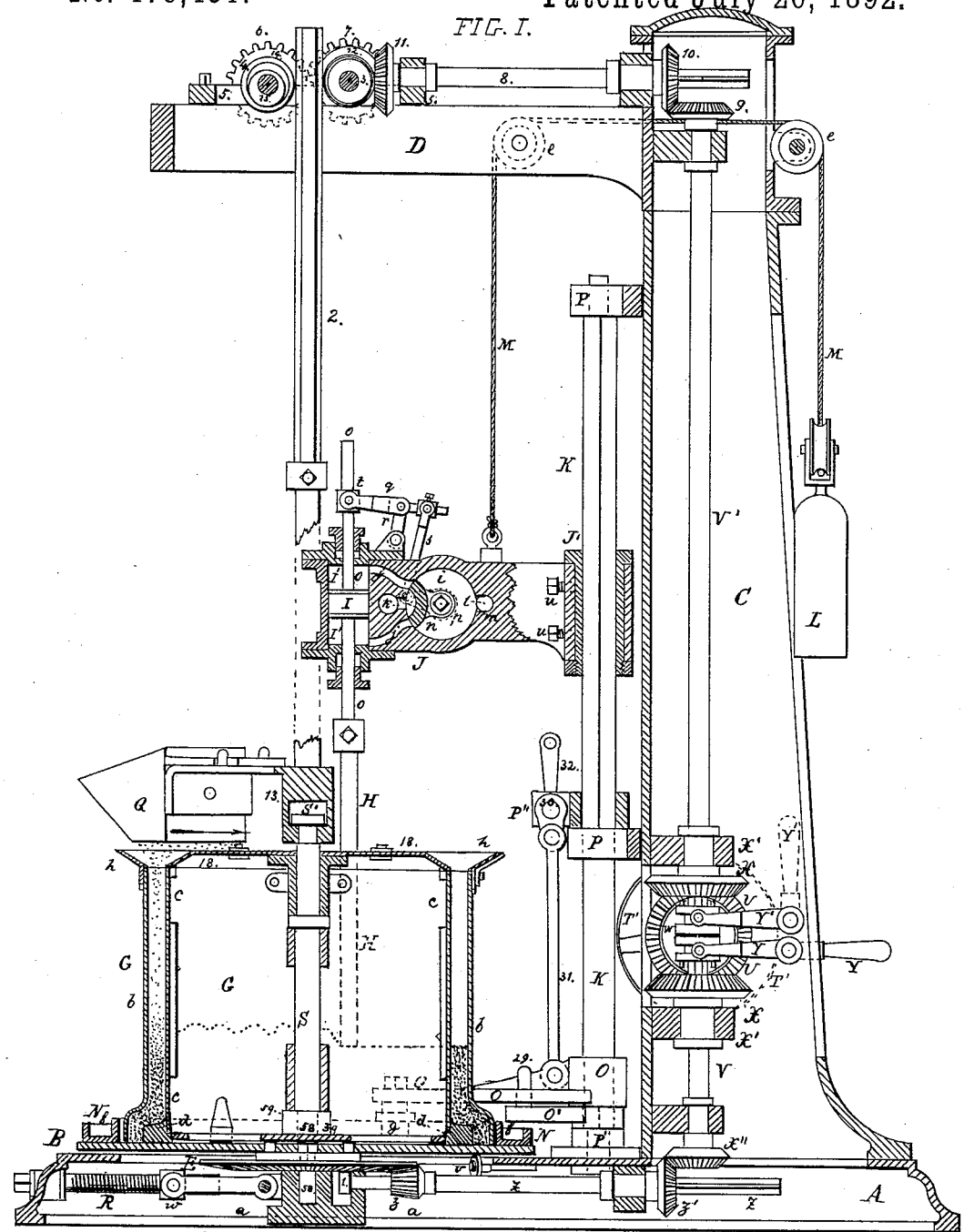
Figure 2:
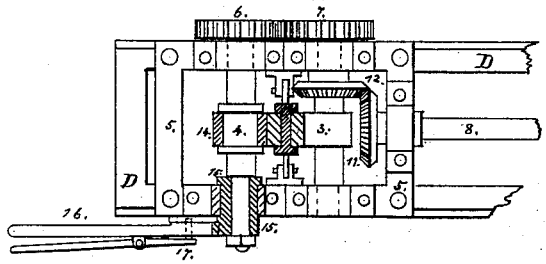
Figure 5:
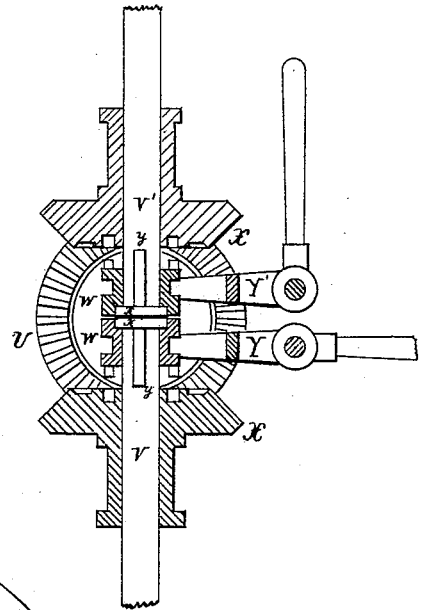
Figure 3:
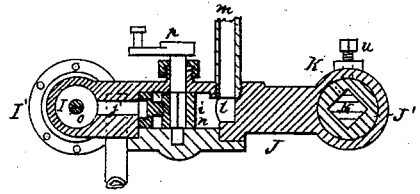
Figure 4:
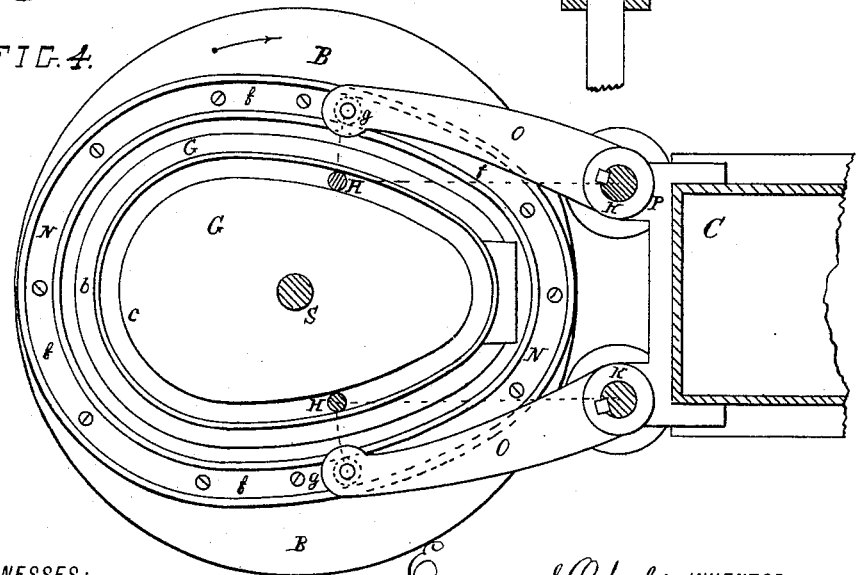
Figure 6:
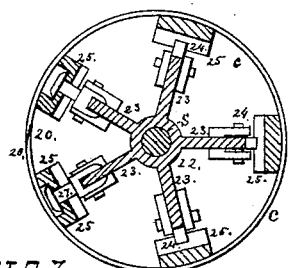
Figure 8:
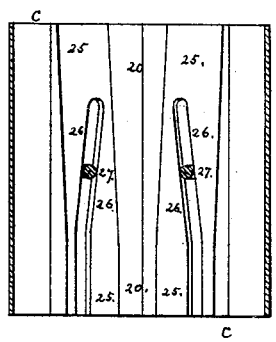
Figure 7:
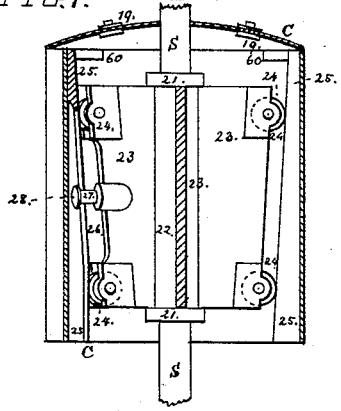
Figure 14:
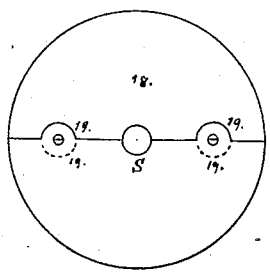

Figure 1 represents a vertical central longitudinal section of the entire machine, showing the molding of the sewer-pipe with its bell downward. Fig. 2 is a detached top view of the core-mold-raising mechanism at the top part of the machine. Fig. 3 is a detached horizontal section of the steam-rammer arm and cylinder and valve of the same. Fig. 4 is a detached top view of the sewer-pipe mold, the rammers, and the steam-cylinder guide-arms, and the mold-guide engaged therewith, all shown on a somewhat larger scale. Fig. 5 is a detached vertical section of the clutches and bevel driving-gear for rotating the pipe-mold and core-raising mechanism of the same. Fig. 6 is a detached horizontal section of the core-mold of the same, shown contracted and removed from the machine and shaped for a round pipe. Fig. 7 is a vertical section of the same. Fig. 8 is a detached vertical section of the shell of the core-mold. Fig. 9 represents a side elevation, with parts bisected, of a modification of the machine for molding the pipe with its bell on the top and shown on a reduced scale. Fig. 10 is a vertical lateral section nearly central through the mold of the same and on the same scale. Fig. 11 is a detached view of the top of the same, shown on a larger scale. Fig. 12 is a horizontal section of the same, taken at the top of the steam-rammer cylinders and arms on the same scale. Fig. 13 is a detached top view of the bell-core mold of the same. Fig. 14 is a top view of the core-mold cover for round pipe.

Similar letters and numerals of reference indicate corresponding parts in the several figures.

The principal mechanisms of this machine consist of, first, a vertical metal type-mold having an exterior section to form the periphery of the pipe and an interior section to form the core and a third section to form the interior of the bell of the pipe; second, a mechanism for contracting said interior section of the mold and for withdrawing or raising the same from the outer section after molding; third, a mechanism for rotating the mold while molding, and, fourth, a mechanism for ramming the cement mixture into the mold by steam-rammers, in conjuction with mechanism for partially counterbalancing the pressure of the steam-rammers to obtain a desired equal density of the rammed cement in the mold.

A represents the bed-plate of the machine, which is hollow underneath. The top of its forward part has a central slot and its hollow space underneath contains the mechanism for supporting the mold and table B and for rotating the same, and also mechanism for adjusting the same longitudinally. Upon the rear portion of said plate is erected a hollow vertical column C, on the top of which is secured a strong forward projecting arm D to carry the core-raising mechanism.

To the bottom side of the table B is attached a large central bevel gear-wheel E, which is supported by a horizontal lateral cross-head F, for which the bed-plate is formed on each longitudinal side with an inward flat flange $a$, upon which the lateral arms of said cross-head rest, as shown in Figs. 1, 9, and 10, so that said cross-head can slide on said flanges from rear to forward, and said gear-wheel E has a trunnion fitted in said cross-head to guide it. Upon the top of the table is carried the sewer-pipe mold G, consisting of three sections, the sheet-metal outside shell $b$ and an inner shell or core-mold $c$, and finally a ring $d$ or inner bell-mold. The bell $b$ is made with a projection for forming the bell and all the shape of the outer surface of the pipe, the shell c to form the inner shape of the pipe and the ring d the inner shape of the bell of the pipe, and between the inner c and outer shell b and this ring d is a space in which the cement mixture is rammed to form the entire pipe. The table B has a central guide-hub 59.

For the purpose of ramming suitably and rapidly the cement mixture into said space of the mold, I employ one, two, or more vertical steam-rammers H, which are each rapidly reciprocated by means of a steam-piston I, operated in a steam-cylinder I', arranged each on an arm J above the mold. Each said arm J is vertically guided by a vertical guide-arbor K, over which said arm slides readily; but each said arm is partly counterbalanced by means of a weight L, as in Fig. 1, or an air-pump 35, (shown in Figs. 9 and 10,) and a rope M, passing over the pulleys e, as shown in Fig. 1. Upon the table B, outside of the periphery of the mold, is attached a guide-ring N, which has a groove f in its top side, and each vertical guide-bar or arbor K has an arm O secured on its lower end, which carries a small friction-roller g, engaging in said groove f. The arbors K are guided each in two bearings P, attached to the column C, and also in step-plates P', attached upon the bed-plate A. The groove f is made to guide the rollers g laterally parallel with the pipe-space in the mold, so that when both arms J and O are made rigid for lateral motion with the arbors K said guide-rollers g guide the rammers H properly in the space for the pipe in the mold. The arbors K, between the bearings P, are made square to prevent the arms J from lateral motion, but allowing liberal vertical motion during ramming. The top of the mold has a detachable rim h, which is flanged outward, and above it is held a loosely-attached hopper Q, into which the cement mixture is fed and drops into the pipe-space of the mold, which rotates toward the rammers, causing them to ram down the cement-mixture in the pipe-space to a solidness which is regulated by the overbalance of the arms J and rammer mechanism over the balance-weight L, or by pressure of air in the pump 35, providing sufficient steam-pressure is employed.

Each steam-cylinder I' forms part of its arm J, which has a circular steam-chest i, connected by the steam-ports j j with the cylinder and the port k with the exhaust, and by the opening l with the steam-pipe m from a suitable boiler. In the steam-chest is employed a vibrating valve n, and it is operated from the piston-rod o of the piston I. The steam-cylinder has a stuffing-box on each head and the piston-rod passes through both heads of the cylinder. To the lower end of the piston-rod is attached the rammer or ram-rod H, by means of a strong socket on the piston-rod. To the upper end of the piston-rod is attached a little cross-head t, with opposite trunnions. The valve n has a lateral arbor passing out of the steam-chest through a stuffing-box and is provided with a crank p on its outside end. A two-armed trip-lever q is pivoted, by means of a fulcrum-link r, to the top of the arm J, and its rear arm is connected by a link s with the crank p, and the forward arm with the cross-head t by its trunnions. By these means the motion from the piston-rod is transmitted to the valve n. The arm O has a rigid lateral position with the arbor K, and to allow for adjustment of relative lateral position of the arms J and O the arms J have over the square opening-sleeve J' upon the arbor K a circular socket formed on the arm with set-screws u to adjust said arm J relative with the arm and hold it rigid laterally. Each arm J is suspended to one of the ends of the rope M, which passes over guide-pulleys suspending with a loop at the rear of the column C from said guide-pulleys e the weight L, which has a swivel guide-pulley, resting in the loop of the rope. The table B travels on friction-rollers v under it, which are attached to the bed-plate to avoid undue friction. For holding and adjusting the mold and table relative with the rammers H and arbors K a horizontal central screw R is employed, having its end guided in the forward end of the bed-plate A. Its threaded shank passes in a threaded cross-head w, which is linked and attached to the cross-head F, as shown. A vertical central arbor S is employed extending through the core-mold c and down through the table B and bevel-gear E into the cross-head F. It is fitted loosely in the bevel-gear and table, and when the core-mold is withdrawn it passes out from said table and gear, but not before the mold c is contracted. For rotating the mold G and operating the core-mold-raising mechanism a horizontal counter-shaft T, (shown in Fig. 9,) with belt-pulleys T' and a bevel-driving gear U, is employed in the column C, as shown in Figs. 1, 9, and 12. It may be arranged longitudinally, as shown in Figs. 9 and 12, or laterally, as shown in Figs. 1 and 5, and in the column C are employed two vertical shafts V and V', which both are arranged in line to each other and nearly meeting at the center line of the counter-shaft T, and at the joining ends each is provided with a shoulder x and a fixed key y, and each over them with a sliding clutch W, (shown in Figs. 1 and 5,) and said shafts V and V' have opposite bevel-gears X X, between which the clutches slide and now and then either engages in said gears X, of which each is held in a bearing X' and turning loose on its shaft. Said bearings are permanently fixed to the column, and said bevel-gears are held to their engagement with the gear V by shoulders on their hubs at each side of the relative bearing. The shaft V extends downward to the bed-plate and the shaft V' upward to connect with the core-raising mechanism. For each clutch W is provided a forked clutch-lever Y to slide the clutch, which has projecting studs to engage in suitable cavities or holes made into its opposite bevel-gear, as shown in Figs. 1 and 5.

For rotating the mold and table B is arranged a central longitudinal horizontal shaft Z under the bed-plate. Upon the forward end of said shaft is provided a bevel-pinion $z$, which engages in the gear E, and over its rearward end is arranged a bevel-gear $z'$, which engages in a bevel-gear X'', fixed permanently to the bottom of the shaft V. By these means the table B is rotated from the shaft V. The forward end of the shaft Z is held in a bearing fixed to the cross-head F, and said end is provided with a collar 1 to move longitudinally with the cross-head. The rear end of said shaft has a groove and slides in the hub of its bevel-gear $z'$, which has a key to engage in said groove, and the hub of gear $z'$ is guided in a bearing attached to the bed-plate, which bearing is fitted between shoulders formed on said hub, thereby holding said gear to its engagement. The lower end of the shaft V is guided, also, by a bearing between shoulders on said shaft and secured to the column, as shown.

The mechanism for raising the core-mold $c$ from the outer shell or mold $b$ consists of a vertical central friction-bar 2, in line and connected over the top end of the arbor S, which has a head S' on its top end. Said bar 2 passes up through the arm D and between a pair of horizontal lateral friction-rollers 3 and 4. The arbors of said friction-rollers rest in bearings formed in a horizontal frame 5, attached upon the top side of the arm D, on which it may be adjusted longitudinally to bring the bar 2 centrally over the arbor S. By means of spur-gears 6 and 7, fixed upon the outer ends of the friction-roller arbors, both friction-rollers are geared and rotate together. A central longitudinal horizontal shaft 8 is arranged in bearings on the top of the arm D between the column C and the friction-roller 3, and upon the top end of the shaft V' is secured a bevel-gear 9, and over the rear end of the shaft 8 a bevel-gear 10, which engages in the gear 9. The forward end of the shaft 8 has secured upon it a bevel-gear 11 and engages with a bevel-gear 12, secured upon the arbor of the friction-roller 3. By this means motion is obtained from the shaft V' to the friction-rollers 3 and 4. The shaft 8 passes through the hub of the bevel-gear 10, and said hub is guided in the rear bearing, which is fitted between shoulders on said hub by means of a groove in the shaft and a key in the opening of the gear engaging therein. The motion from the gear is transmitted to the shaft, which is allowed to slide longitudinally for adjustment of the bar 2 with the arbor S. The bottom end of the bar 2 has a swivel-head 13 over the arbor-head S' to allow the arbor S to revolve loose therein, but to overlap said head S', and capable of drawing up said arbor. The portion of the bar 2 engaged by the friction-rollers is made flat, and consists of an I-beam cross-area-shaped central metal bar with a flat hardwood strip facing the periphery of each friction-roller, of which the roller 4 has a loose ring 14 over its periphery to engage with the bar 2 and to pinch or grip the bar 2 for raising it. One of the journals of the roller 4 is held in an eccentric-hub 15 in the bearings, as shown in Figs. 1 and 2, and to said eccentric-hub is attached a hand-lever with a spring-catch 17, by which means said friction-roller 4, with its ring 14, is powerfully pressed against the bar 2 for raising the same, and by turning the lever 16 back with the eccentric said friction-roller is readily relieved from the bar 2 for dropping said bar 2. The inner shell or core mold $c$ is constructed with a metal cover 18 from the central arbor S to the top mold $c$ periphery, as shown in Figs. 1 and 11, to prevent the sand and cement dropping inside said mold. Said cover is made in two sections, with overlapping lips 19 and screws to be easily detached. The peripherical shell $c$ of this mold is made of sheet steel, with one longitudinal overlapping-joint 20, as shown in Figs. 6 and 8. Said shell is cylindrical and of a diameter when suspended and contracted by its arbor S considerable smaller than the required diameter of the core of the pipe. The arbor S has two fixed hubs 21, and between the hubs 21 upon the shaft S is employed a long sleeve 22, which has preferably five vertical radial flat wings or arms 23 extending from it and each provided with a vertical friction-roller 24, pivoted near and on each top and bottom end of the same. The shell opposite each wing 23 has secured to it vertical taper strips 25, as shown. The periphery described by the rollers 24 on the top parts of the wings is considerably larger than the periphery described by the rollers 24, attached to the bottom ends of the wings, and the inner periphery described by the rollers when the shell is suspended and contracted to enter readily in the outer mold; but the inner periphery of the taper strips 25 at the lower ends being enough smaller that by resting the shell $c$ in its place in the mold and allowing the shaft S, with the wings 23 and their rollers, to settle down said shell is expanded to the proper full size of the core of the pipe.

To assist the shell to contract and get free from the molded pipe, as in drawing the core-mold out from the pipe, I provide two or more of the strips 25 with vertical inclined slots 26, and have these slotted strips hollow on their back toward the shell, and the wings 23 opposite the slotted strips are provided with a stud 27, passing in said slots, and the stud provided with a head 28, lapping over the inside of the slot. By this means when the wings, with the shaft, are drawn up the shell is drawn or contracted inward to pass out the pipe readily; but the bottom pivot 58 of the shaft S does not disengage from its guide until said shaft has contracted the core-mold $c$.

The inner bell-core mold $d$ is a ring secured upon the table B. It is made of a diameter to provide an equal and sufficient space between it and the outer mold $b$ to form the bell of the pipe. The arms O may be permanently secured upon the arbors K; but when desirable to swing readily the ramming mechanism out of the way of the mold G said arbors K have each a separate arm O', solidly secured below the arm O on the arbor K, and have a vertical stud 29 loosely through the arm O, which in this case is loose on the arbor K. A short arm P'' is secured at the bearing P, carrying a small lateral arbor with a crank 30, and the arm O is connected with the crank 30 by a rod 31. By means of a hand-crank 32 the arbor and crank 30 are turned, and by this means the arm O is raised out of the engaging stud 29 and its friction-roller $g$ out of the groove $f$, and thereby the arms J may swing out of the way from the mold G.

Operation: The outer mold $b$, the bell-mold $d$, and inner mold C being properly placed upon the table B, cement mixture is fed in the hopper Q and from it delivered into the space between the inner mold $c$ and outer mold $b$. By means of the lever Y and the clutch W the bevel-gear X is connected to turn the shaft V, and consequently by the shaft Z the gears X'' $z'$ and pinion $z$, and gear E the table B and mold G' revolve. Steam is admitted through the pipe $m$ and the trip-valves $n$ into the steam-cylinders and cause reciprocating motion of the rammers H H. As the cement is packed to a desired density the arms J are raised by the weight L. After the mold is filled with packed cement mixture to its top the hopper Q is detached and the top end of the pipe is made smooth by hand. The shaft V is stopped by the lever Y and the second clutch W is engaged with its wheel X by the lever Y' to rotate the shaft V', causing the shaft 8 and the gears 9, 10, 11, and 12 and 6 and 7, with the friction-rollers 3 and 4, to rotate. The hand-lever 16 is now moved, causing the gripping of the bar 2 by the friction-rollers 3 and 4, and the bar 2 caused to draw up the arbor S, its hubs 21 and 22, and draw the wings 23, contracting the core-mold $c$, and finally contract and raise said mold out from the newly-molded pipe. After elevated entirely above the mold $b$, the shaft V' is stopped and the mold $b$ is raised and removed from the table B and a following mold $b$ is placed and the core-mold $c$ therein lowered and inserted. The hopper Q is now placed again and the cement is fed and the machine started, as before described.

The cement sewer-pipes are required of various sizes—round, egg, and other shaped peripheries—to suit the various volumes of delivery and pressures, and the molding of the pipe is conditional to the size and shape of the pipe. Certain pipe can be molded with the bell down, as shown in Figs. 2, 3, 4, 5, 6, 7, and 8; but other of such pipe is preferred to be molded with the bell up, and the devices employed are also modified and arranged as shown in Figs. 9, 10, 11, 12, and 13. In such case the mold is placed on the table with the bell up, and the bell-mold $d$ is constructed with contracting and expanding sections 33 and 34 and is held stationary above the pipe-mold contracted for the rammers to pass, while the cement is rammed in the pipe-space below its bell, as shown by Figs. 1, 2, and 13. The same devices for rotating and adjusting the table B and devices for raising the core-mold $c$ and devices for operating the rammers H are used as before; but instead of the balance-weight L a vertical air-pump 35 is employed in the column C, and the pulley suspended in the loop of the rope M is attached to the piston-rod 36 of the air-pump, the pressure of the air in the pump-cylinder acting upon the piston similar to the weight L. The supply of air to said pump is obtained by a small feed-pump 37, pivoted on one of the steam-cylinders I'. (Shown in Figs. 9 and 10.) Said feed-pump is operated by a stud 38, connecting the steam piston-rod with the feed-pump rod 39. The compressed air is delivered by a hose-pipe 40, connecting said feed-pump 37 with the air-pump 35. Said pipe 40 is furnished with a check-valve 41 and a stop-cock 42, and to regulate the desired pressure in the air-pump to the desired density of the cement mixture rammed I employ a weighted safety-valve 43 on the air-pump 35. Instead of guiding the rammers H and arms J and O by means of the grooved guide-ring N, the arms O have rollers $g'$ to bear on the side of the mold $b$, (shown in Figs. 9 and 10,) and the arbors K near their top end have each a fixed bent arm 44, extending to the rear of the column C. To the rear ends of these arms are attached the ends of a rope 45, which is suspended with a central loop over the guide-pulleys 46 and 47, and by a guide-pulley 48 in said loop is suspended a heavy weight 49. The weight 49 pulls the arms 44 outward, and therefore their arms O, with their rollers $g'$, bear against the periphery of the mold G, and thereby guiding the rammers H parallel in the pipe-space of the mold. Instead of stopping by hand the bar 2 from raising at its terminal, said bar has a cam 50, and the frame 5 has a down extension 51 through the arm D. To this extension is pivoted a double-armed lever 52. Its rear arm is connected by the rod 53 with the clutch-lever Y and with the forward arm of said lever. The cam 50 comes in contact at the terminal upward travel of the bar 2 and causes the clutch W, removed from the bevel-gear X, to stop the motion of the shaft V'. The arm J in this case is allowed to turn on its sleeve J', and above the arm J is employed an arm 54, fitted with a square opening over the arbor K, and a double-armed lever 55 is pivoted upon the arm 54. The arbor K has a groove 56, in which the rear arm of the lever 55 engages, and the forward arm of said lever is pivoted to the forward part of the arm J. After the pipe-space in the mold has been filled to the bottom of the bell portion the rammers H are caused by the arm J and lever 55 to move outward into the bell-mold by means of an offset in the groove 56, which causes the levers 55 to swing the arms J outward. The bell-mold $d$ is now lowered into the bell of the mold and is in lowering expanded to its full periphery for the bell-opening of the pipe by means of the cone 57, attached over said mold and being forced downward. Thereafter the cement is fed in the bell, and the rammers proceed ramming while the mold is turning until entirely completing the bell, after which the core-molds $d$ and $c$ are removed, as before described. The core-mold shell $c$ is made of sheet steel and of a smaller diameter than the proper pipe-core. By means of the sleeve 22, placed therein, said shell $c$ is expanded. When said shell is brought home into the mold $b$ to its bottom rest and the sleeve 22, with its wings 23, brought home to rest by the shaft S, said shell $c$ is fully expanded to the diameter of the core of the pipe. The shaft S has the bottom pivot 58 passing into the hub of the table B and gear-wheel E. When the core-mold $c$ is withdrawn from the mold $b$, the shaft S first rises to contract said mold $c$. It is guided with its pivot 58 during contracting said mold $c$ in said hub of the table B to allow the shell $c$ contracting centrally. After being fully contracted the wings 23 come in contact with the stops 60 and cause the rising of the shell $c$ with the shaft S, and its pivot 58 thereafter passes out from the hub of the table B and the mold $c$ is raised entirely out of the mold $b$, as before described.

What I claim as my invention, and desire to secure by Letters Patent, is—

1. In a cement sewer-pipe-molding machine, the combination, with the horizontally-rotating pipe-mold, of the vertically-sliding arm or rammer-stock, the guide-bar upon which it is arranged to slide, the steam or air cylinder carried by said arm, the piston having a rammer secured to its rod, and a counterbalancing device or weight, substantially as specified.

2. The combination, with the rotating sewer-pipe and the vertical raising core-mold mechanism shown, of the steam-rammers H, with the arms J, the pistons I, cylinders I', and the weight L, and guide-arbors K and arms O, with friction-rollers $g$, and the guide-ring N, substantially as and for the purpose herein mentioned.

3. The combination, with the rotating pipe-mold consisting of the outer shell $b$, the expanding core-mold $c$, and bell-mold $d$, the rotating mechanism shown, and the core-mold-raising mechanism shown, of the steam rammer or rammers H, with their cylinders I', piston I, valve $n$, the arbor K, the arms J, and the weight L, substantially as and for the purpose herein set forth.

4. The combination, with the horizontally-rotating pipe-mold consisting of the outer shell $b$ and core-mold $c$ and bell-mold $d$, and the mold-rotating mechanism shown, of the steam rammer or rammers H, with their pistons I, and cylinders I', and the arms J and arbors K and weight L, and the core-mold-raising mechanism consisting of the friction-rollers 3 and 4 and the bar 2 and gears 6 and 7, the shaft 8 and V', and the bevel-gears 9, 10, 11, and 12, substantially as and for the purpose herein set forth.

5. In a sewer-pipe-molding machine, the combination, with a rotating table B and guide-hub 59 and the outer mold $b$ and bell-mold $d$, of the inner mold $c$, with the shaft S and its pivot 58, the sleeve 22, the wings 23, the shoulders 21, the rollers 24, the studs 27, the slots 26, and stops 60.

6. In a sewer-pipe machine, the combination of a rotary mold comprising an expansible vertically-movable core, mechanism for raising said core, a drive-shaft, gearing therefrom to rotate said mold, a clutch to throw said gearing into or out of gear with the drive-shaft, gearing from the drive-shaft to operate the core-raising mechanism, and a clutch to throw said gearing into and out of gear with the drive-shaft, substantially as described.

7. In a pipe-machine, the combination, with a rotary mold, of a vertically-adjustable support arranged above the mold, provided with a cylinder having suitable ports and valve, and a reciprocating piston in said cylinder, the piston-rod thereof being provided with a rammer to operate on the substance in the mold, said valve being connected with and operated by said piston-rod, substantially as described.

8. In a sewer-pipe machine, the combination, with the mold, of a vertically-adjustable and laterally-movable support above the mold, an automatic reciprocating engine carried by said support above the mold, and a rammer carried by the piston-rod of said engine to pack the substance in the mold, substantially as described.

9. In a sewer-pipe machine, the combination of the rotary mold, a vertically and laterally movable support, means, substantially as described, for counterbalancing the same, a vertically-disposed automatic reciprocating steam or air engine carried by such support, a rammer carried by the piston-rod of such engine to pack the material in said mold, and means, substantially as described, controlling the lateral swing of said support and engine.

10. In a sewer-pipe machine, the combination of the rotary mold and means for rotating the same, the vertical shaft, a vertically-movable support on the shaft, an automatic reciprocating engine carried by and moving laterally and vertically with said support, a rammer carried by the piston-rod of said engine to pack the material in said mold, a counterbalancing device for said support and engine, and means, substantially as described, connected with said shaft to automatically turn the same to swing said support and engine laterally, substantially as described.

11. The combination, with a mold, of a vertically-disposed vertically-movable automatic reciprocating steam or air engine, a rammer carried by the piston-rod of said engine to pack the material in the mold, and operating mechanism whereby there is a relative movement between the mold and engine, so that the material is packed around the mold, substantially as described.

12. In combination, the vertically-movable support having a cylinder formed therein, a steam-chest communicating with opposite ends of the cylinder, a rocking valve controlling the ports and exhaust, a reciprocating piston in the cylinder, connections between the piston-rod and said valve to automatically operate the same, the rammer carried by said piston-rod, and a mold in which said rammer operates, substantially as described.

13. In combination, the mold, mechanism for rotating the same, a vertical shaft and supports therefor, an arm connected with said shaft and engaging the mold to control the turning of the shaft, a horizontal support mounted to turn with and slide vertically on said shaft and provided with raising means, and a reciprocating steam or air engine carried by said support and vertically disposed and having its piston-rod provided with a rammer to pack the material in the mold, substantially as described.

14. The combination, with the rotary mold, of the vertical shaft, an arm therefrom engaging said mold to control turning of shaft, means, substantially as described, to throw said arm out of operative relation with the mold, and the vertically-movable reciprocating engine having its carrier sliding on said shaft, substantially as described.

15. In combination, a bed, a rotary table supported thereon and capable of horizontal adjustment, a mold on said table, mechanism for adjusting said table horizontally, comprising a movable cross-head connected with said table, a screw for shifting the head and table, a movable shaft mounted in said head and geared to drive said table, and mechanism for driving said shaft, substantially as described.

16. In combination, a mold having a removable core provided with an upwardly-extending lifting-bar, a support extending upwardly and over the mold, a horizontally-adjustable frame on said support, two horizontal shafts carried by said frame, provided with friction-wheels to engage and lift said bar, and a longitudinally-adjustable drive-shaft geared to drive said horizontal shafts, substantially as described.

17. In a sewer-pipe machine, the combination, with operating and lifting mechanism, of a mold comprising an outer shell and an inner removable expansible core having inclined vertical faces, as described, and a lifting-bar having means to engage said faces when moving down and thereby expand the core, and means, substantially as described, whereby the core is contracted when said bar is raised, substantially as described.

18. In combination, the mold having its bell end at the top, a bell-mold, and steam or air ramming engine located above the same and capable of moving vertically and laterally, and means, substantially as described, to automatically swing said ramming-engine laterally to pack the bell when the mold is filled to the bell, substantially as described.

19. The combination of the mold having its bell at the top, the vertically-movable expansible bell-mold, and rammers and operating mechanism, substantially as described.

20. The combination of the mold, a vertically-movable steam or air ramming engine for said mold, an air-pump carried by the carrier of said engine and automatically operated by the movement of the engine, and a cylinder supplied by said pump and having its piston connected to raise said engine, substantially as described.

21. The combination of the rotary mold, the vertical shafts having arms held against the sides of the mold to control turning of shafts, means to yieldingly hold the arms against the mold, and the steam or air ramming engines carried by said shafts, substantially as described.

EMANUEL OEHRLE.

In presence of—
A. C. TROUP,
HENRY M. MORROW.